June 30, 1942. H. HANSON ET AL 2,288,087
APPARATUS FOR FORMING DUSTLESS CARBON BLACK
Filed July 29, 1940
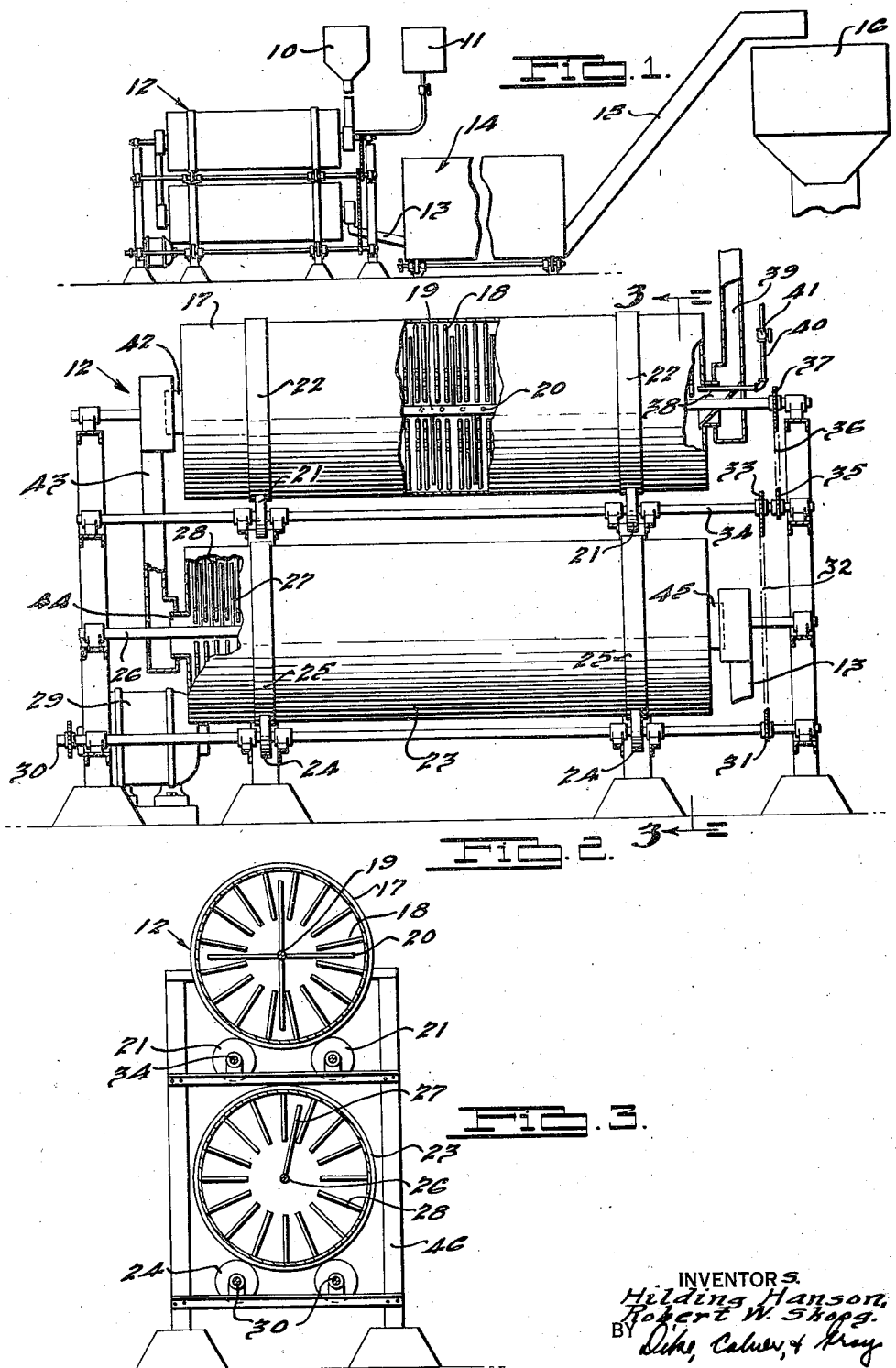

Patented June 30, 1942

2,288,087

UNITED STATES PATENT OFFICE

2,288,087

APPARATUS FOR FORMING DUSTLESS CARBON BLACK

Hilding Hanson, Charleston, W. Va., and Robert W. Skoog, Borger, Tex., assignors to United Carbon Company, Inc., Charleston, W. Va., a corporation of Delaware Application July 29, 1940, Serial No. 348,322

2 Claims. (Cl. 259—65)

The present invention relates to the manufacture of dustless carbon black and particularly to a novel apparatus for use in such manufacture.

The objects of the present invention are:

First, to provide an apparatus adapted for use in the manufacture of dustless carbon black on an economical and commercial basis to assure the large scale production of commercially uniform agglomerates of carbon black.

Second, to provide an apparatus for the commercial manufacture of dustless carbon black characterized in that the apparatus may be readily controlled to produce dustless carbon black agglomerates having desired predetermined sizes and shapes and in which the dispersibility of the carbon black in a dispersion medium is not adversely affected as a result of the processing.

Third, to provide an apparatus for the commercial manufacture of dustless carbon black which is characterized in that it is adapted for a continuous operation as distinguished from a batch operation, the apparatus being adapted to feed the agglomerated carbon black in a predetermined path toward the discharge end of the apparatus in such a way as to assure the substantially complete agglomeration of all the carbon black fed to the apparatus and the substantially uniform treatment of all carbon black passing therethrough.

Other objects and advantages of this invention will appear in the following description and appended claims, reference being had to the accompanying drawing forming a part of this specification, wherein like reference characters designate corresponding parts in the several views.

Fig. 1 is an elevation showing the general layout and arrangement of various units of apparatus employed in the manufacture of dustless carbon black according to the present invention.

Fig. 2 is an elevation of the agglomerating apparatus with parts broken away and showing an agglomerating unit adapted for use in the manufacture of dustless carbon black according to the present invention.

Fig. 3 is a sectional view taken substantially on the line 3—3 of Fig. 2 looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the manufacture of dustless carbon black the untreated flocculent carbon black is subjected to a suitable treatment to cause it to form agglomerates which have a density such that the agglomerates are not readily dispersed into the air. At the same time it is important that such agglomerates possess a readily frangible structure such that they may be readily broken up and dispersed when desired in various types of selected dispersion mediums such, for example as rubber master batches, or in oils or other vehicles used in the manufacture of printing ink, paints, coating compositions, plastic bodies and the like.

At the present time there are in commercial use two general types of processes for forming dustless agglomerates of carbon black. The so-called "dry" process which relies upon agitation of the dry flocculent carbon black to cause it to agglomerate and form spherical dustless particles. The so-called "wet" process effects a wetting of the dry flocculent carbon black with some suitable wetting agent such, for example, as water to form a wetted friable mass which is then treated to form the desired type of wet agglomerate. After the wet agglomerate is shaped it is then subjected to suitable treatment in an oven or other apparatus to remove the wetting agent from the particles. The present invention relates to the manufacture of dustless carbon black by a wet process as above described.

Referring to Fig. 1, dustless carbon black may be formed according to the present invention, by supplying dry flocculent carbon black from a carbon storage container 10 to an agglomerating member indicated generally by the numeral 12. At the same time a suitable wetting agent is supplied from the storage tank 11. After the admixed carbon black and water passes through the agglomerator indicated by the numeral 12, it is formed into small spherical pellets which are delivered through a conveyor 13 to a rotary drier 14 where substantially all of the wetting agent is removed from the pellets. The dry pellets are then conveyed through the conveyor 15 to the dustless storage compartment 16.

The particular apparatus to which the present invention refers is the agglomerating apparatus referred to generally by the numeral 12. As shown in Figs. 2 and 3, this apparatus consists essentially of an upper rotary drum 17 which is provided with a plurality of inwardly extending substantially radial pins or arms 18 which are arranged in courses inside of the shell of the drum. A central rotary shaft 19 extends transversely of the drum 17 and is provided with a plurality of outwardly extending radial pins or arms 20 which are arranged to move relative to the pins 18 extending inwardly from the shell of the drum 17. The radial pins or arms 18 secured to the drum 17 and the plurality of the pins or arms 20 on the shaft 19 are so arranged that upon relative rotation between the drum 17 and the shaft 19, the pins move in separate paths which are slightly spaced from each other. The drum 17 is supported on rollers 21 which are keyed to a power driven shaft 34 which effects rotation of the rollers. The rollers rotate in ways 22 provided on the drum 17 and thus cause the drum 17 to rotate.

A lower drum 23 is rotatably supported on rollers 24 which are keyed to the shaft 30 and rotate with said shaft. The rollers 24 rotate in ways 25 provided on the drum 23 and thus cause the drum 23 to rotate. A central shaft 26 extends transversely of the drum 23 and is provided with a single row of pins or arms 27 which extend outwardly from said shaft and occupy positions between adjacent courses of the pins or arms 28 which extend inwardly and substantially radially of the drum 23. In the preferred embodiment of the invention the central shaft 26 in the drum 23 is stationary and the drum 23 rotates relative to it. It is to be understood, however, that if desired the shaft 26 may be mounted for rotation in the drum 23 and may be power driven for this purpose.

In the embodiment of the invention shown in Figs. 2 and 3 the upper drum 17 and the lower drum 23 both rotate. The shaft 19 in the upper drum 17 also rotates but the shaft 26 in the lower drum 23 does not rotate. These motions are transmitted to the respective parts by a driving mechanism which includes a suitable motor 29 which is connected to effect rotation of the shaft 30. The rotation of the shaft 30, as previously described, causes rotation of the rollers 24 and the drum 23. At the same time rotation of the shaft 30 causes rotation of the sprocket 31 which is connected by a suitable driving connection such as the chain 32 with a sprocket 33 which is keyed to the shaft 34. This effects rotation of the shaft 24 which, as previously described, drives the rollers 21 and causes rotation of the upper drum 17. Rotation of the shaft 34 also causes rotation of the sprocket 35 which is keyed thereon and this rotation is transmitted through a suitable connecting member such as the drive chain 36 to the sprocket 37 which is keyed to the upper drum shaft 19.

An inlet 38 is provided in the upper drum and is connected with a duct 39 for conveying dry flocculent carbon black from the storage compartment 10 to the inlet 38. A feed pipe 40 is provided with a control valve 41 and provides for metering a predetermined amount of wetting agent into the dry carbon black as it enters the inlet 38 of the upper drum 17. The feed pipe 40 communicates with a suitable source of wetting agent which is stored in a storage tank 11. The wetting agent may be any desired type of agent which is effective to wet the carbon black and cause it to form agglomerates as it passes through the agglomerating apparatus. In the preferred carrying out of the present invention water is used as such wetting agent. While the relative amounts of carbon black and water may be varied within limits, it is desirable that the relative proportion of water to carbon black should be such as to form a wetted friable mass. In the preferred embodiment this consists of approximately 40% to 50% of water and 60% to 50% of carbon black by weight.

As the carbon black and wetting agent are caused to pass through the upper drum 17 due to the rotary motion of the drum and the rotary motion of the shaft 19, it is formed into clumps and agglomerates which, while generally spherical in shape, are irregular and of relatively non-uniform size. This preliminarily formed mass is discharged from the outlet 42 of the upper drum 17 into the duct 43 which leads into the inlet 44 of the lower drum 23. As the wetted mass of carbon black passes through the lower drum 23 it is formed into spherical agglomerates which are relatively uniform in size and shape and which are relatively non-adherent. The thus formed agglomerates of wetted carbon black are discharged from the outlet 45 to the conveyor 13 which conducts such agglomerates to the rotary oven or other suitable drier 14 where the agglomerates are subjected to suitable temperatures to remove substantially all of the wetting agent therefrom. The dry spherical agglomerates of carbon black are then conveyed through the conveyor 15 to the dustless carbon storage 16.

A suitable frame 46 is provided for supporting the drums 17 and 23, the shafts 19 and 26, and the driving mechanism previously described, see Fig. 3. In the preferred embodiment of the agglomerator used in the present invention, as shown in Figs. 1, 2 and 3, the drum 17 is mounted directly above the drum 23. It is to be understood, however, that the drums may be mounted in any desired positions relative to each other and that the arrangement of the drums, as here described, is preferred chiefly because of the compactness of the unit resulting from this arrangement of the parts.

The dry flocculent carbon black, which preferably is used in forming the agglomerated carbon black according to the present invention is an agitated hot house black having a density of approximately 3 lb. per cu. ft. After processing according to the present invention the dustless agglomerated carbon black has a density of approximately 24 lb. per cu. ft. Upon examination of the dustless agglomerates it was found that each particle consisted of a substantially spherical pellet formed of densely compacted carbon black particles. The moisture content was approximately 0.25% and the particle sizes had an average diameter ranging from .011 inch to .015 inch. Upon testing the whole mass of the agglomerated black on standard testing screens it was found that approximately 97.7% was retained on a 100 mesh screen, that approximately 1.47% was retained on a 200 mesh screen, and that approximately .038% was retained on a 300 mesh screen. The balance of the material passed through the screen and was recovered from the pan.

We claim:

1. An apparatus for the manufacture of dustless carbon black and comprising a mixing chamber for admixing predetermined amounts of dry carbon black and a wetting agent to form a wetted friable mass, said mixing chamber comprising a rotatable drum having a rotatable shaft extending lengthwise therethrough, a plurality of radial pins on said drum extending inwardly thereof toward said shaft, a plurality of radial arms on said shaft and extending outwardly thereof toward said drum, and a rotary agglomerating chamber located beneath said mixing chamber and comprising a rotatable drum, a stationary shaft extending lengthwise of said last named drum, a plurality of radially extending pins secured to said drum and projecting inwardly toward the center thereof, a single row of pins secured to and positioned longitudinally along said stationary shaft and projecting outward in one direction only toward said drum, the pins on said drum and the single row of pins on said stationary shaft lying in alternating courses.

2. An apparatus for the manufacture of dustless carbon black and comprising a mixing chamber for admixing predetermined amounts of dry carbon black and a wetting agent to form a wetted friable mass, said mixing chamber comprising a rotatable drum having a rotatable shaft extending lengthwise therethrough, a plurality of radial pins on said drum extending inwardly thereof toward said shaft, a plurality of radial arms on said shaft and extending outwardly thereof toward said drum, a rotary agglomerating chamber located beneath said mixing chamber and comprising a rotatable drum extending in a horizontal plane substantially parallel to the plane of said first named rotatable drum, a stationary shaft extending lengthwise of said last named drum, a plurality of radially extending pins secured to said drum and projecting inwardly toward the center thereof, a plurality of pins secured to said stationary shaft and extending outward in one direction only toward said drum, the pins on said last named drum and stationary shaft lying in alternating courses, and power operated means for rotating both of said drums and the shaft in said mixing chamber.

HILDING HANSON.
ROBERT W. SKOOG.